United States Patent [19]

Veasy et al.

[11] Patent Number: 5,311,333
[45] Date of Patent: May 10, 1994

[54] IMAGE PROCESSING APPARATUS

[75] Inventors: Julian F. Veasy, Bucks.; Stephen Freeman, Bedfordshire, both of

[73] Assignee: Crosfield Electronics Limited, Hertfordshire, United Kingdom

[21] Appl. No.: 54,840

[22] Filed: Apr. 30, 1993

Related U.S. Application Data

[63] Continuation of Ser. No. 690,181, Apr. 19, 1991, abandoned.

[30] Foreign Application Priority Data

Apr. 20, 1990 [GB] United Kingdom ............... 9008947

[51] Int. Cl.$^5$ .............................................. H04N 1/46
[52] U.S. Cl. .................................. 358/518; 358/522; 358/523; 358/530
[58] Field of Search .................... 358/75, 76, 80, 77, 358/79, 518, 522, 523, 530, 500; H04N 1/46

[56] References Cited

U.S. PATENT DOCUMENTS 4,942,462  7/1990  Shiota ................................ 358/75
5,079,624  1/1992  Sasuga et al. ..................... 358/75

FOREIGN PATENT DOCUMENTS 0344976  12/1989  European Pat. Off. ..... H04N 1/387

OTHER PUBLICATIONS

"Lookup Table Loadings for Image Processing with Controlled Knots", J. M. Rebordao, *Computer Vision, Graphics, and Image Processing* 47, 189–202 (1989).
European Search Report, Jun. 24, 1993.

Primary Examiner—Mark R. Powell
Assistant Examiner—Jerome Grant, II
Attorney, Agent, or Firm—Sughrue, Mion, Zinn, Macpeak & Seas

[57] ABSTRACT

Image processing apparatus comprises a color converter for converting an input value, defining the color component content of a pixel of an image, to an output value, the color converter being adapted to convert groups of input values to respective, common output values.

5 Claims, 2 Drawing Sheets

IMAGE PROCESSING APPARATUS

This is a continuation of application No. 07/690,181 filed Apr. 19, 1991 abandoned on Jun. 23, 1993.

FIELD OF THE INVENTION

The invention relates to image processing apparatus of the kind comprising colour conversion means for converting an input value, defining the colour component content of a pixel of an image, to an output value. Such apparatus is hereinafter referred to as of the kind described.

DESCRIPTION OF THE PRIOR ART

Image processing apparatus of the kind described is used in a number of different applications. For example, such apparatus can be used in colour correction processes when handling digital versions of images to be printed.

SUMMARY OF THE INVENTION

We have developed a new type of apparatus of the kind described in which the colour conversion means is adapted to convert groups of input values to respective, common output values.

Typically, each group of input values is associated with a different common output value. However, this is not essential.

This new apparatus finds particular application in graphics image creation systems in which an artist manipulates an electronic input device which simulates electronically a paintbrush in order to create an image on a display screen which may then be stored in the form of digital data. The effect of the invention is to reduce contone to clearly bounded areas of single colour which can lead to particularly attractive artistic features.

In one example, each non-zero input value of each colour component is associated with a non-zero output value. However, in the case of an image represented by a number of different colour components, at least some input values may be associated with a zero output value. Typically, in the case where the image is represented by a number of colour components, the relationship between input and output values for each colour component will differ.

Preferably, the output values generally increase with increasing input values although this is not essential and special effects could be achieved with other types of variation such as "negatives".

The values themselves may represent any conventional characteristic of the colour components for example colour densities, transmittances and the like.

The colour conversion means may be constituted by a suitably programmed computer or by hardware circuits and the like.

BRIEF DESCRIPTION OF THE DRAWINGS

An example of apparatus and a method in accordance with the present invention will now be described with reference to the accompanying drawings, in which.

DETAILED DESCRIPTION OF THE EMBODIMENTS

Figure 1:
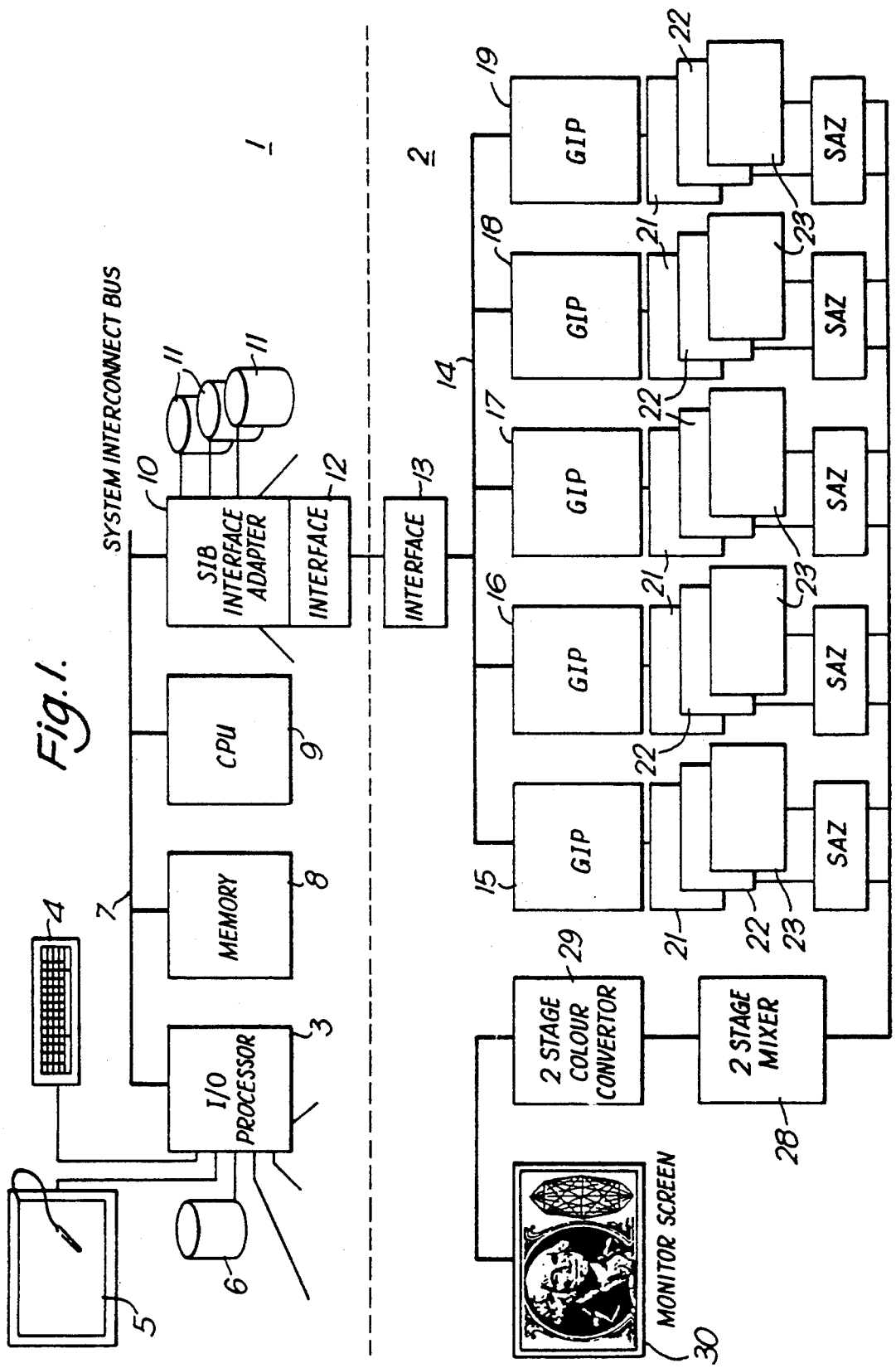
FIG. 1 is a block diagram of the apparatus.

The apparatus shown in FIG. 1 can be divided into two primary parts. These comprise the host 1 and the graphics sub-system 2. The division is shown in FIG. 1 by a dashed line. The host 1 is a 68020 microprocessor based system running UNIX which is a multi-tasking, multi-user operating system. The host comprises an I/O processor 3 coupled to a keyboard 4, a digitizing tablet 5 and associated pen 31, a system disk 6 and other data sources (not shown). The I/O processor 3 is connected to a system inter-connect bus (SIB) 7 which is connected to ROM and RAM memory 8, a CPU 9, and an interface adapter 10. The interface adapter 10 is connected to a number of high speed image discs 11 which hold data defining the colour content of pixels of images at high resolution, the adapter also being connected via an interface 12 with the graphics sub-system 2. As mentioned above, the host has a conventional form and will not be described in detail. However, the SIB 7 is described in more detail in EP-A-0332417.

The program that runs on the host is a single "process" which reads and processes inputs from the digitizing tablet 5 under operator control and directs the graphics part 2 to display the host's responses to those inputs on the graphics monitor 30. Essentially, the system takes advantage of the host system in being able to perform a majority of the calculations so that only a small amount of control data is passed to the graphics sub-system. This graphics part 2 is much better than the host 1 at creating and manipulating graphical objects but the host is better at controlling input/output to peripherals, discs and tapes and is relatively easy to program.

The graphics sub-system 2 comprises an interface 13 which connects the graphics part to the host 1, the interface 13 being connected to a bus 14. The bus 14 is connected to five graphics image processors (GIPS) 15–19. In this embodiment, it is assumed that the images are defined by four colour components, namely cyan, magenta, yellow and black, there being a separate GIP for each colour. Thus, the GIP 15 processes the cyan colour component, the GIP 16 the magenta colour component, the GIP 17 the yellow colour component and the GIP 18 the black colour component. If the image was represented by a different number of colour components, for example red, green and blue then only three of the GIPs would be needed. The advantage of providing the GIPs 15–18 in parallel is that each component of each pixel in the image can be processed in parallel so that the overall processing time is reduced by up to four times over the processing time with a single processor. A further advantage of using the GIPs is that each has a bit-slice processor on which the programmer can define instructions useful for a particular application.

A fifth GIP 19 is provided for defining one or more masks and other features.

Figure 2:
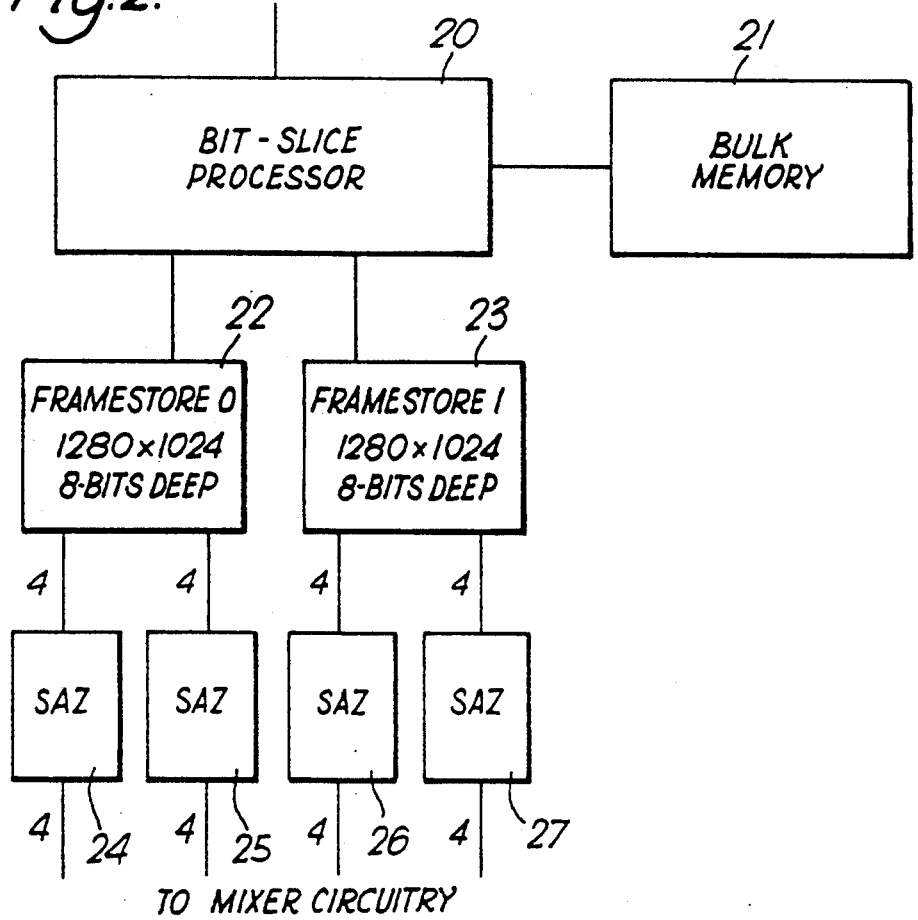
FIG. 2 is a block diagram of the graphics image processor of FIG. 1.

The construction of one of the GIPs of FIG. 1 is shown in FIG. 2. Each GIP comprises a bit-slice processor 20 coupled to bulk memory 21. This memory 21 will hold image data, brush profiles and text as required and is used as virtual image memory.

The bit-slice processor 20 is also connected to a pair of framestores 22, 23 each of which has dimensions 1280×1204 and is 8 bits deep. In the GIPs 15–18, each framestore will hold 8 bit colour data while in the mask GIP 19 each framestore can be used to hold 8 bit masks or two separate 4 bit masks. Furthermore, one of the framestores in the GIP 19 can be used to display menus in one four bit plane and overlays in the other four bit plane. Overlays comprise construction lines and boxes and the like which are to be displayed on the monitor.

The eight bit data in each framestore 22, 23 is applied in four bit "nibbles" to respective scroll, amplify and zoom circuits 24-27 which operate in a conventional manner to perform one or more of the functions of scroll, zoom and amplify, the outputs from these circuits being fed to a mixer circuit 28. The circuit 28 mixes the data from each of the framestores 22 associated with the GIPs 15-18 with the data from each of the frame stores 23 associated with the GIPs 15-18 in accordance with the mask stored in the framestore 22 of the GIP 19. This mixer circuit which operates in two stages is described in more detail in EP-A-0344976.

The output from the mixer circuit 28 is fed to a two stage colour converter 29 which in a first stage converts the four colour component data to three colour component data e.g. red, green and blue suitable for controlling the display on a monitor screen 30, and in a second stage modifies the colour component data to suit the particular monitor.

In use, images are stored on the high speed image disks 11 and these images may have been generated by scanning original transparencies or other representations or they may have been created electronically using an electronic paint brush. The host 1 causes relevant portions of these images to be "paged" in and out of the bulk memory 21 in the GIPs 15-18 and brush profiles to be loaded and unloaded from the bulk memory 21 in the GIP 19. The interface adaptor 10 has its own 68020 processor to allow it independently to control the disks 11. The GIPs 15-18 are directed by the host 1 to do various things to images in the bulk memory 21 so that when a GIP attempts to access an address in an image that is not currently in its bulk memory then part of that memory is written back to disc and a new portion read in. After the GIPs have finished processing, the data in the framestores is then scrolled, zoomed and/or amplified as necessary, mixed in the circuit 28, converted to monitor format and then displayed.

If the host 1 wishes to display menus on the screen, these are drawn into the mask GIP framestore 23, known as the "overlay plane".

Three look-up tables are provided in the mixer circuit 28 (there is one for each of the three colour components, Red, Green, and Blue), each having an address corresponding to each possible input density value of the associated colour component and in the present example each will have 256 addresses. Each address is loaded with an output colour density value.

Figure 3A:
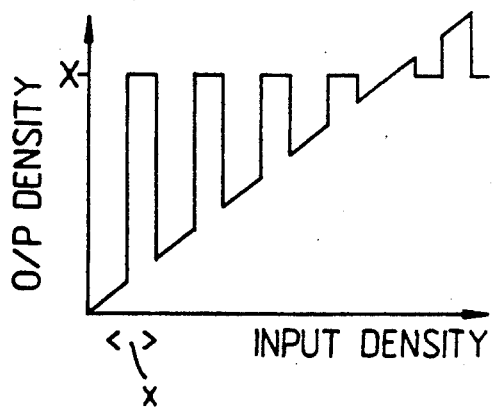
FIGS. 3A and 3B illustrate two examples of the contents of the colour converter of FIG. 1.

FIG. 3A illustrates one example of the values which are stored in a look-up table. As can be seen in FIG. 3A, successive groups of input density values are associated with a respective, common output density value. For example, input values in the range x are all associated with an output value X. Consequently, the value X is loaded into each of the addresses of the look-up table corresponding to the input density values in the range x. It will be noted in the particular case of FIG. 3A that there is a non-zero output density value corresponding to each non-zero input density value.

Figure 3B:
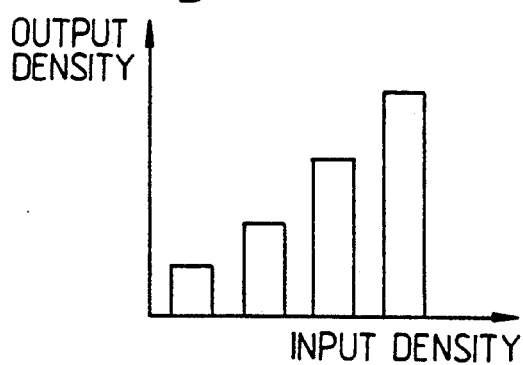

FIG. 3B illustrates another type of function in which groups of input density values which are associated with non-zero output density values are separated from one another by a number of input density values associated with zero output density values.

In practice, the look-up tables in the mixer circuit 28 may each be loaded with functions of the form shown in FIG. 3A or of the form shown in FIG. 3B or a mixture of the two. Furthermore, the position of the steps for each colour component may be the same or different.

If the steps are small then the effect on the display is one of graininess and a limited range of colours gives the appearance of an oil painting. When the steps are slightly larger the effect becomes one like pointillism.

In operation, the user will generate on the display 5 each colour conversion function and then cause the look-up tables in the colour converter 29 to be loaded with the finally selected functions by suitably manipulating the pen 31. The modified image will be displayed on the display 5. If the operator wishes, he can arrange for the modified image to be "grabbed back" and stored in the frame stores 21 and if required, the discs 11.

We claim:

1. Image processing apparatus for processing input signals defining the values of colour components of pixels of an image comprising colour conversion means for converting each of said input signals to an output signal defining the value of a colour component of pixels of an image, wherein said colour conversion means is adapted to convert said input signals defining values in a plurality of spaced input ranges to said output signals which, for each respective spaced input range, have the same, respective output values and wherein input values between said spaced input ranges have an output value different from each adjacent range.

2. Apparatus according to claim 1, wherein each non-zero input value of each colour component is associated with a non-zero output value.

3. Apparatus according to claim 1, wherein at least some input values are associated with a zero output value.

4. Apparatus according to claim 1, wherein said output values generally increase with increasing input values.

5. Apparatus according to claim 1, wherein said input and output values represent any one of colour densities and transmittances of the colour components.

* * * * *